(12) United States Patent
Kawahara et al.

(10) Patent No.: US 6,658,492 B1
(45) Date of Patent: Dec. 2, 2003

(54) SYSTEM AND METHOD FOR REDUCING THE FOOTPRINT OF PRELOADED CLASSES

(75) Inventors: Hideya Kawahara, Mountain View, CA (US); Nedim Fresko, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/045,508

(22) Filed: Mar. 20, 1998

(51) Int. Cl.$^7$ .................................................. G06F 9/00
(52) U.S. Cl. ........................ 709/332; 717/166; 717/159
(58) Field of Search ................................ 709/332, 331; 717/151–167

(56) References Cited

U.S. PATENT DOCUMENTS

| | | | | |
|---|---|---|---|---|
| 5,734,822 A | * | 3/1998 | Houha et al. ................ 709/216 |
| 5,815,718 A | * | 9/1998 | Tock ............................ 709/331 |
| 5,966,542 A | * | 10/1999 | Tock ............................ 713/1 |
| 5,966,702 A | * | 10/1999 | Fresko et al. .................. 707/1 |
| 6,052,778 A | * | 4/2000 | Hagy et al. ................... 709/331 |
| 6,061,520 A | * | 5/2000 | Yellin et al. ................... 703/22 |
| 6,223,346 B1 | * | 4/2001 | Tock ............................ 713/1 |
| 6,324,637 B1 | * | 11/2001 | Hamilton ...................... 711/216 |
| 6,339,841 B1 | * | 1/2002 | Merrick et al. ........... 707/103 R |
| 6,349,344 B1 | * | 2/2002 | Sauntry et al. ................ 709/1 |
| 6,363,436 B1 | * | 3/2002 | Hagy et al. ................... 709/331 |
| 6,366,898 B2 | * | 4/2002 | Taivalsaari et al. ............ 707/1 |
| 6,526,565 B1 | * | 2/2003 | Nally .......................... 717/108 |
| 6,530,080 B2 | * | 3/2003 | Fresko et al. ................. 717/166 |

FOREIGN PATENT DOCUMENTS

EP 943989 A2 * 9/1999 ............. G06F/9/44

OTHER PUBLICATIONS

Sun Microsystems. "PersonalJava 1.1 Memory Usage Technical Note." 1998.*
"The Java™ Virtual Machine Specification", Tim Lindholm, Frank Yellin, 475 pages, ©1997, ISBN 0201–63452–X.

* cited by examiner

*Primary Examiner*—John Follansbee
*Assistant Examiner*—Lewis A. Bullock, Jr.
(74) *Attorney, Agent, or Firm*—Pennie & Edmonds LLP

(57) ABSTRACT

A method and system that reduces the space allocated for internal data structures by a runtime engine. The internal data structures store member information for preloaded classes used by applications executed by the runtime engine. The system determines the different types of internal data structures represented in the classes and identifies thee possible values of each type's members. The system next determines the amount of space required to store the values for each type in a respective value table and the number of bits needed to index each entry of that table. The system determines based on the stored information whether occurrences of a member are optimally represented as a set of value table indices and a value table or, in the conventional manner, as a general variable that stores the member's value for each occurrence. The system then emits appropriate information for the member and its parent data structure.

44 Claims, 12 Drawing Sheets

Data Structure Declarations
1230

| | |
|---|---|
| Data Structure 1 Decl. | 1230.1 |
|     Member 1.1 Decl. | 1232.1.1 |
|     Member 1.2 Decl. | 1232.1.2 |
|     Member 1.3 Decl. | 1232.1.3 |
|     . . . | |
|     Member 1.1 Acc'or Fun | 1234.1.1 |
|     Member 1.2 Acc'or Fun | 1234.1.2 |
|     Member 1.3 Acc'or Fun | 1234.1.3 |
|     . . . | |
| Data Structure 2 Decl. | 1230.2 |
| Data Structure 3 Decl. | 1230.3 |
| . . . | |
| Data Structure N Decl. | 1230.N |

1230.N

| | |
|---|---|
| Struct T { | |
|     mtype1 member1 | 1232.N.1 |
|     mtype2 member2 | 1232.N.2 |
|     mtype3 member3 | 1232.N.3 |
|     mtype4 member4 | 1232.N.4 |
|     mtype5 member5 | 1232.N.5 |
| } | |
| member1 of (T) : T->member1 | 1234.N.1 |
| member2 of (T) : T->member2 | 1234.N.2 |
| member3 or (T) : T->member3 | 1234.N.3 |
| member2 of (T) : T->member2 | 1234.N.4 |
| member3 or (T) : T->member3 | 1234.N.5 |

FIG. 2B
(Prior Art)

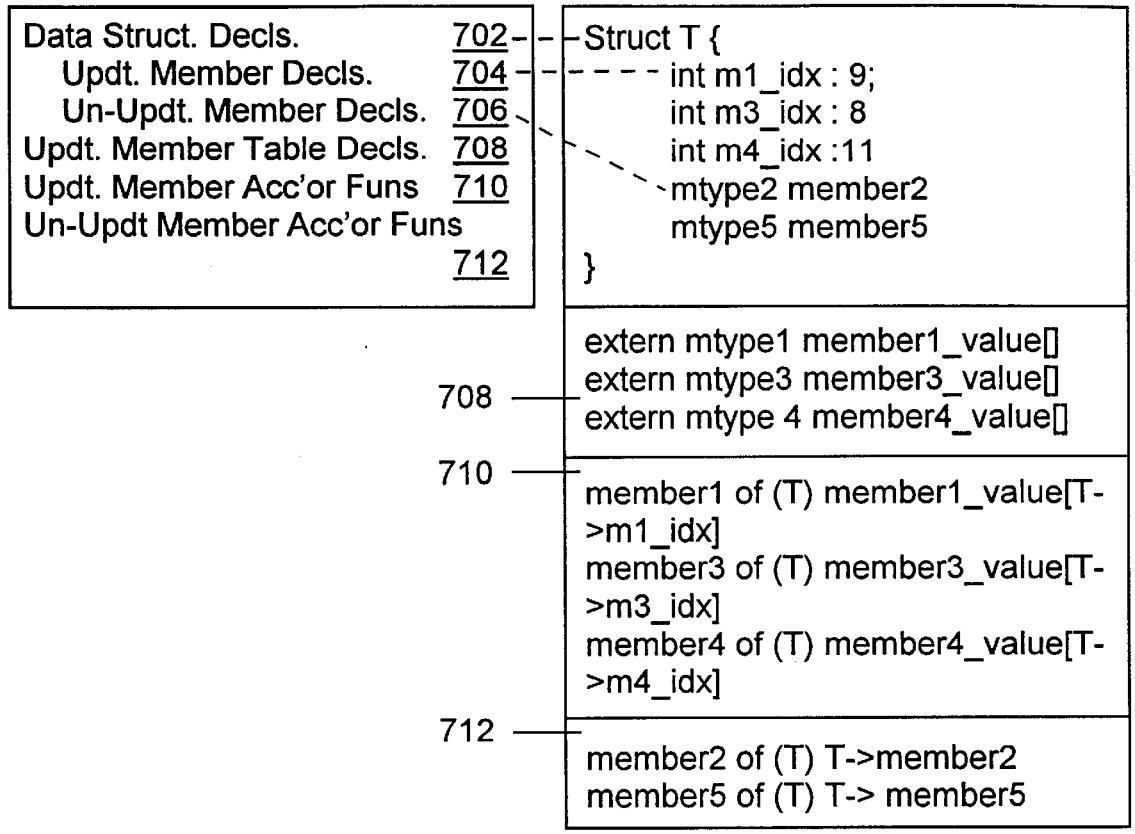

Updated Header File 614

Data Struct. Decls. 702
　Updt. Member Decls. 704
　Un-Updt. Member Decls. 706
Updt. Member Table Decls. 708
Updt. Member Acc'or Funs 710
Un-Updt Member Acc'or Funs
　　712

Struct T {
　int m1_idx : 9;
　int m3_idx : 8;
　int m4_idx :11;
　mtype2 member2
　mtype5 member5
}

708 —
extern mtype1 member1_value[]
extern mtype3 member3_value[]
extern mtype 4 member4_value[]

710 —
member1 of (T) member1_value[T->m1_idx]
member3 of (T) member3_value[T->m3_idx]
member4 of (T) member4_value[T->m4_idx]

712 —
member2 of (T) T->member2
member5 of (T) T-> member5

FIG. 7A

Value Tables 616 (.c)

| Member 1 Table | 722.1 |
| Member 3 Table | 722.3 |
| Member 4 Table | 722.4 |
| ... | |

722.1

```
const mtype1 member1_value[] = {
    val 1;
    val 2;
    ...
    val 400;
}
```

FIG. 7B

Data Structure Memory Usage in Present Invention for one occurrence of Data Structure T 902

Data Structure Memory Usage in Prior Art for one occurrence of Data Structure T 906

SYSTEM AND METHOD FOR REDUCING THE FOOTPRINT OF PRELOADED CLASSES

The present invention relates generally to a class preloader and, particularly, to a system and method for reducing the size in read only memory of preloaded Java classes.

BACKGROUND OF THE INVENTION

A Java program comprises a number of small software components called classes. Each class contains code and data and is defined by information in a respective class file. Each class file is organized according to the same platform-independent "class file format". Referring to FIG. 1, there is shown a block diagram of the class file format, according to which each class file 400 includes header information 402, a constant pool 404, a methods table 406 and a fields table 408. The header information 402 identifies the class file format, the size of the constant pool, the number of methods in the methods table 406 and the number of fields in the fields table 408. The constant pool 404 is a table of structures representing various string constants, class names, field names and other constants that are referred to within the class file structure and its sub-structures. The methods table 406 includes one or more method structures, each of which gives a complete description of and Java code for a method explicitly declared by the class. The fields table 408 includes one or more field structures, each of which gives a complete description of a field declared by the class. An example of the fields table 408 is now described in reference to FIG. 1B.

A Java program is executed on a computer containing a program called a virtual machine (VM), which is responsible for executing the code in Java classes. It is customary for the classes of a Java program to be loaded as late in the program's execution as possible: they are loaded on demand from a network server or from a local file system when first referenced during the program's execution. The VM locates and loads each class, parses the class file format, allocates internal data structures for its various components, and links it in with other already loaded classes. This process makes the method code in the class readily executable by the VM.

For small and embedded systems for which facilities, required for class loading, such as a network connection, a local file system or other permanent storage, are unavailable, it is desirable to preload the classes into read only memory (ROM). One preloading scheme is described in U.S. patent application Ser. No. 08/655,474 ("A Method and System for Loading Classes in Read-Only Memory"), which is entirely incorporated herein by reference. In this method and system, the VM data structures representing classes, fields and methods in memory are generated offline by a class preloader. The preloader output is then linked in a system that includes a VM and placed in read-only memory. This eliminates the need for storing class files and doing dynamic class loading.

Referring to FIG. 2A, there is shown a more detailed block diagram of the VM data structures 1200.generated by the class preloader. The data structures 1200 include a class block 1202, a plurality of method blocks 1204, a plurality of field blocks 1214 and a constant pool 1224.

The class block 1202 is a fixed-size data structure that can include the following information:
 the class name 1230;
 a pointer 1232 to the class block of the current class's immediate superclass;
 a pointer 1234 to the method blocks 1204;
 a pointer 1236 to the field blocks 1214; and
 a pointer 1238 to the class' constant pool;
The elements of a class block data structure are referred to herein as class block members.

A method block 1204 is a fixed-sized data structure that represents one of the class's methods. The elements of a method block data structure are referred to herein as method block members. A field block 1214 is a fixed-size data structure that represents one of the class's instance variables. The elements of a field block data structure are referred to herein as field block members.

Each type of VM data structure, including the class block 1202, method blocks 1204, field blocks 1214 and constant pool 1224, has a format defined by a corresponding data structure declaration. For example, a single method block declaration defines the format of all method blocks 1204. The data structure declarations also define accessor functions (or macros) that are used by the VM to access data structure members. These data structure declarations are internal to the VM and are not used by class components. The prior art data structure declarations are now described in reference to FIG. 2B.

Referring to FIG. 2B, there is shown a depiction of data structure declarations 1230 that define the format of all data structure types employed by a particular VM. Each declaration 1230 includes a set of member declarations 1232 and accessor functions 1234 for accessing respective members. The member declarations 1232 and accessor functions 1234 are defined conventionally, according to the syntax of the language used in the implementation of the VM. For example, assuming the C language is used in the data structure declarations 1230, a generic field data structure 1230.N (shown in FIG. 2B) could be defined as a structure T with five members of the following types with respective accessor functions:

| member name | member type | accessor functions |
| --- | --- | --- |
| member1 | mtype1 | mem1 of (T) T->member1 |
| member2 | mtype2 | mem2 of (T) T->member2 |
| member3 | mtype3 | mem3 of (T) T->member3 |
| member4 | mtype4 | mem4 of (T) T->member4 |
| member5 | mtype5 | mem5 of (T) T->member5 |

In this example, the member types can be any type defined by the relevant computer language, including user defined types or language types, such as integer, float, char or double. The accessor functions are macros used by the VM to access the fields without needing to access directly the structure containing the field. For example, instead of employing the expression "T→member1" to access field1 in structure type T, the VM need only employ the expression "mem1 of (T)". Accessor functions are well known in programming languages, such as C, that provide sophisticated data structure capabilities.

The internal data structures used to store "class meta data" (i.e., the class, method and field blocks 1202, 1204, 1214) require large, fixed amounts of space in read-only memory. In fact, measurements indicate that this sort of class meta data often takes up much more space than the bytecodes for the class methods themselves. These internal data structures are therefore often unsuitable for use in small, resource-constrained devices in which class preloading is desirable and/or necessary.

Moreover, if the internal data structures were individually modified to save memory space, the VM code would need to be extensively revised to enable the VM to correctly access the modified data structures. To make such changes to the VM could be onerous and inefficient.

Therefore, there is need for a modified representation of the internal data structures that is smaller in size than the prior art data structures, includes all information required by the VM, and does not require extensive or onerous modification of the VM code.

SUMMARY OF THE INVENTION

In summary, the present invention is a method and system that reduces the ROM space required for preloaded Java classes.

In particular, the method and system of the present invention are based upon the realization that, in an environment where the Java VM classes are preloaded, it is highly likely that the VM would be a closed system with a set number of classes and class components, such as fields and methods. Such a closed VM would include a fixed number of internal data structures, such as class blocks, method blocks and field blocks. Moreover, each member of these data structures (e.g., a method block or field block member) would have one of a well-known set of distinct values.

Given this assumption and its implications, the present invention reduces the memory space required to represent the internal data structures by:

1) determining distinct values of each type of data structure member;
2) determining occurrences of each data structure member type (e.g., each occurrence in the method blocks of a field block member type) and each occurrence's value;
3) determining memory space that would be saved if each occurrence were represented as an index to a table of values of the data structure member type rather than conventionally (storing the value for each occurrence in a general variable); and
4) if sufficient savings would result, allocating a value table containing the distinct data structure member type values and configuring each occurrence of that field block member type as an index to the appropriate value table entry; and
5) generating new sources to the VM so that its access to the modified structures is adapted automatically.

In a preferred embodiment, the decision is made to represent a data structure member type as a value table index plus a value table if the following comparison is true:

(#occurrences of type)×(size of index)+(size of value table)<(#occurrences of type)×(size of general variable).

Once the present method has determined for each data structure member type whether an occurrence of that type is to be represented as an index into a value table or as a general variable storing the value, the present method emits appropriate information for that type, including accessor functions, language declarations and source code that initializes the value tables. The accessor functions are macros through which all runtime access to the data structure members is accomplished-by the VM. Preferably, prior to emitting the above-described information, the present method determines the most compact arrangement of the value table indices, conventional representations of members and value tables and generates the value tables, value table indices, accessor functions and classes accordingly.

The present method emits accessor functions, declarations and other data structure information after determining whether to modify the conventional representation of the data structure members. As a result, all emitted data structure information is consistent with changes in the internal class representation. This automatic generation of consistent data structure information minimizes changes to the VM that are required whenever new classes are added to the VM, and whenever class representations change. This provides a significant improvement over the prior art.

The system of the present invention includes a collection of class files, a Java class preloader in which the above method is implemented and output files generated by the preloader, including preloaded classes, header files and source code files.

The class files define the complete set of classes to be preloaded. The preloader performs a first pass on the class files to determine the: different types of members of the internal data structures, distinct values of each type of member,
amount of space required to store the values,
the size of the value indices, and
the number of occurrences of each member type.

The preloader then performs a second pass on the class files and the internal data structures to determine how each member is to be represented, conventionally or as an index to a value table entry, and then emits the appropriate output files.

The output files are compatible with similar files employed by conventional Java systems. That is, the preloaded classes can be assembled or compiled into class object data and the header files and source files can be compiled with VM sources into VM object data. The VM and class object data can then be linked in the conventional manner into the executable VM for a particular Java environment.

BRIEF DESCRIPTION OF THE DRAWINGS

Additional objects and features of the invention will be more readily apparent from the following detailed description and appended claims when taken in conjunction with the drawings, in which:

FIG. 2B illustrates the data structure declarations that define the format of the VM internal data structures shown in FIG. 2A;

FIG. 7A illustrates the organization of the updated header file 614 of FIG. 6;

FIG. 7B illustrates the organization of the value table 616 of FIG. 6;

DESCRIPTION OF THE PREFERRED EMBODIMENT

The method and system described herein are directed to a Java class preloader configured to output preloaded Java classes that are optimized for storage in the ROM of a target computer (referred to herein as the execution engine). Given that the execution engine is likely to be a computer with little or no secondary storage, it is preferable that the Java class preloader be implemented in a separate computer, which shall be referred to herein as a server. Assuming such a configuration, the preloaded classes could be transferred from the server to the execution engine in a variety of ways (e.g., network connection, direct communication link or "sneaker net" transfer of readable media, such as floppy disks or CDs). Accordingly., a preferred embodiment of the present invention described herein is directed to a computer system with a server and an execution engine wherein the preloaded classes are generated by the server and subsequently transferred to the execution engine for use in the VM. The preferred embodiment is now described in reference to FIGS. 3 and 4.

Figure 3:
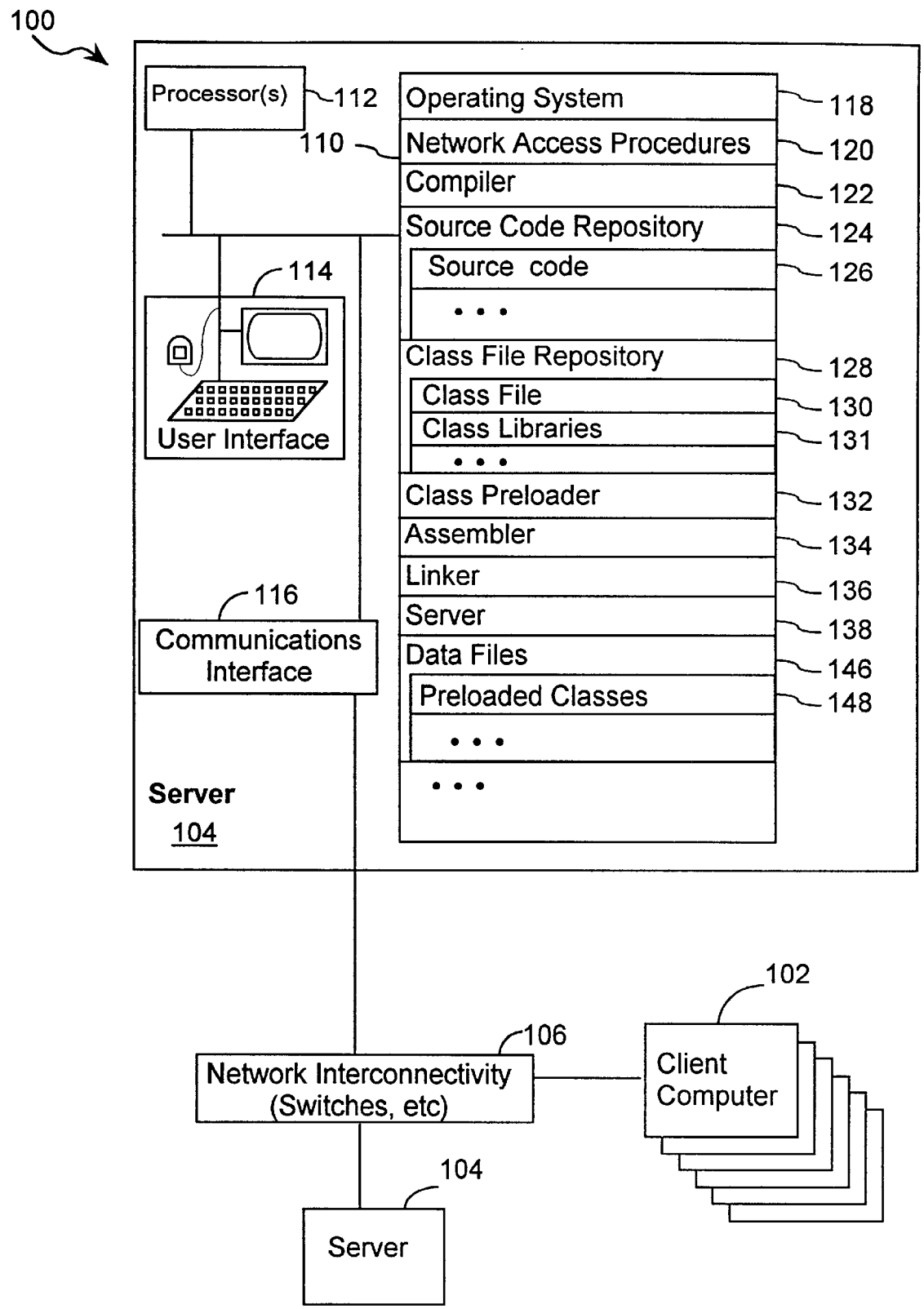
FIG. 3 is a block diagram of a distributed computer system in which the class preloader system and method of the present invention can be implemented.

Referring to FIG. 3, there is shown a distributed computer system 100 in which the present invention is implemented. The computer system 100 has one or more execution engines 102 and one or more server computers 104. In a preferred embodiment, each execution engine 102 is connected to the server 104 via the Internet 106, although other types of communication connections between the computers 102, 104 could be used (e.g., network connection, direct communication link or sneaker net transfer of readable media, such as floppy disks or CDs). Preferably, the server and execution engines are desktop computers, such as Sun workstations, IBM compatible computers and/or Apple Macintosh computers; however, virtually any type of computer can be a server or execution engine. Furthermore, the system is not limited to a distributed computer system. It may be implemented in various computer systems and in various configurations, or makes or models of tightly-coupled processors or in various configurations of loosely-coupled microprocessor systems.

The server computer 104 typically includes one or more processors 112, a communications interface 116, a user interface 114, and memory 110. The memory 110 stores:

an operating system 118;

an Internet communications manager program or other type of network access procedures 120;

a compiler 122 for translating source code written in the Java programming language into a stream of bytecodes;

a source code repository 124 including one or more source code files 126 containing Java source code;

a class file repository 128 including one or more platform-independent class files 130 and one or more class libraries 131 containing class files, each class file containing the data representing a particular class;

a class preloader 132 that generates a set of preloaded classes 148 for a particular configuration of the execution engine (the class preloader is sometimes referred to as a static class loader);

an assembler 134 that produces an object file representing the class members, class data structures and memory storage indicators in a format that is recognizable for the linker;

a linker 136 for determining the memory layout for a set of preloaded classes and for resolving all symbolic references; and one or more data files 146 for use by the server (including the. preloaded classes 148).

Note that the class file repository 128, class preloader 132, assembler 134 and linker 136 need not reside on, the server 104, but can be on any computer whose output (e.g., files or messages representing the preloaded classes 148) can be copied to the execution engine 102.

Figure 2A:
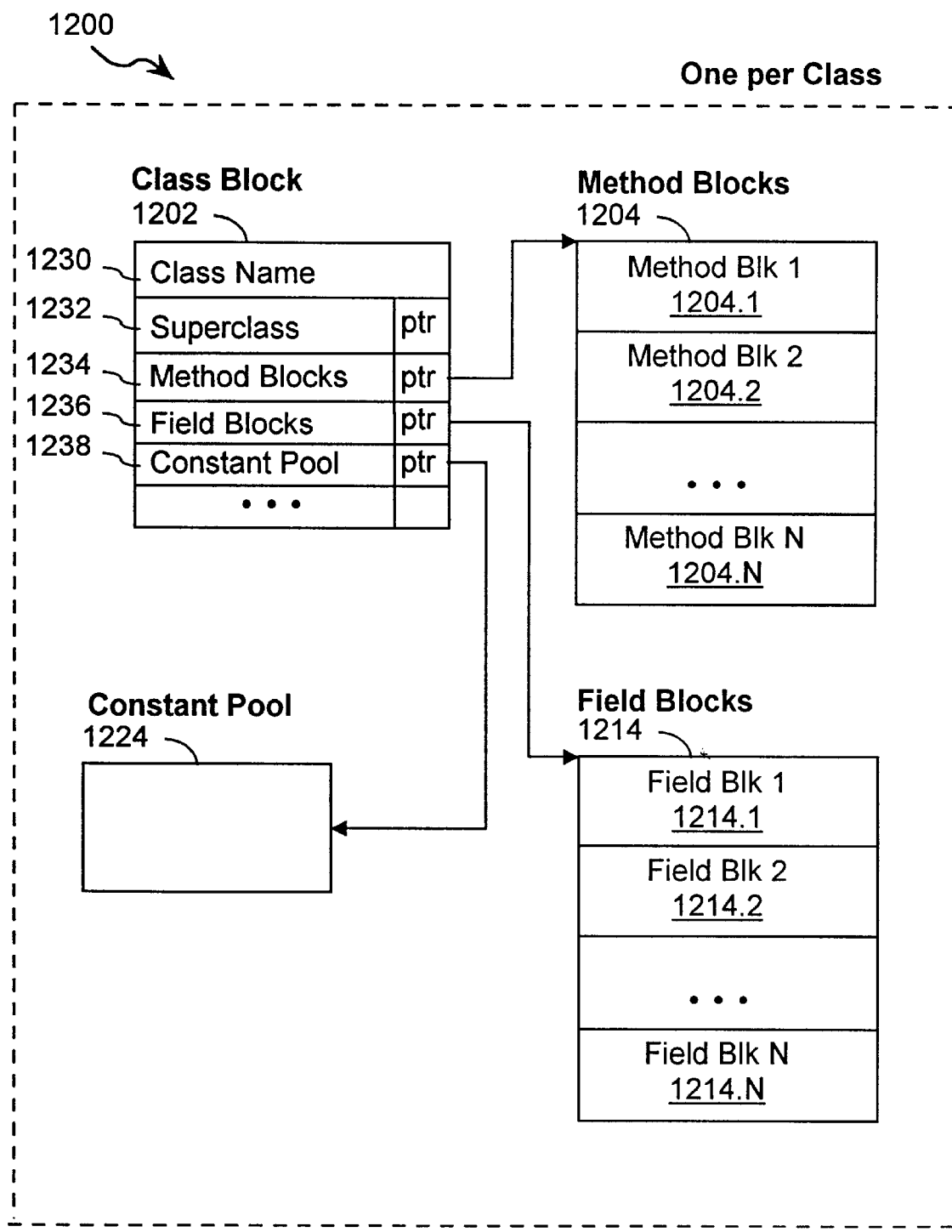
FIG. 2A is a block diagram of VM internal data structures used in the prior art to encode class, method and field information.
Figure 4:
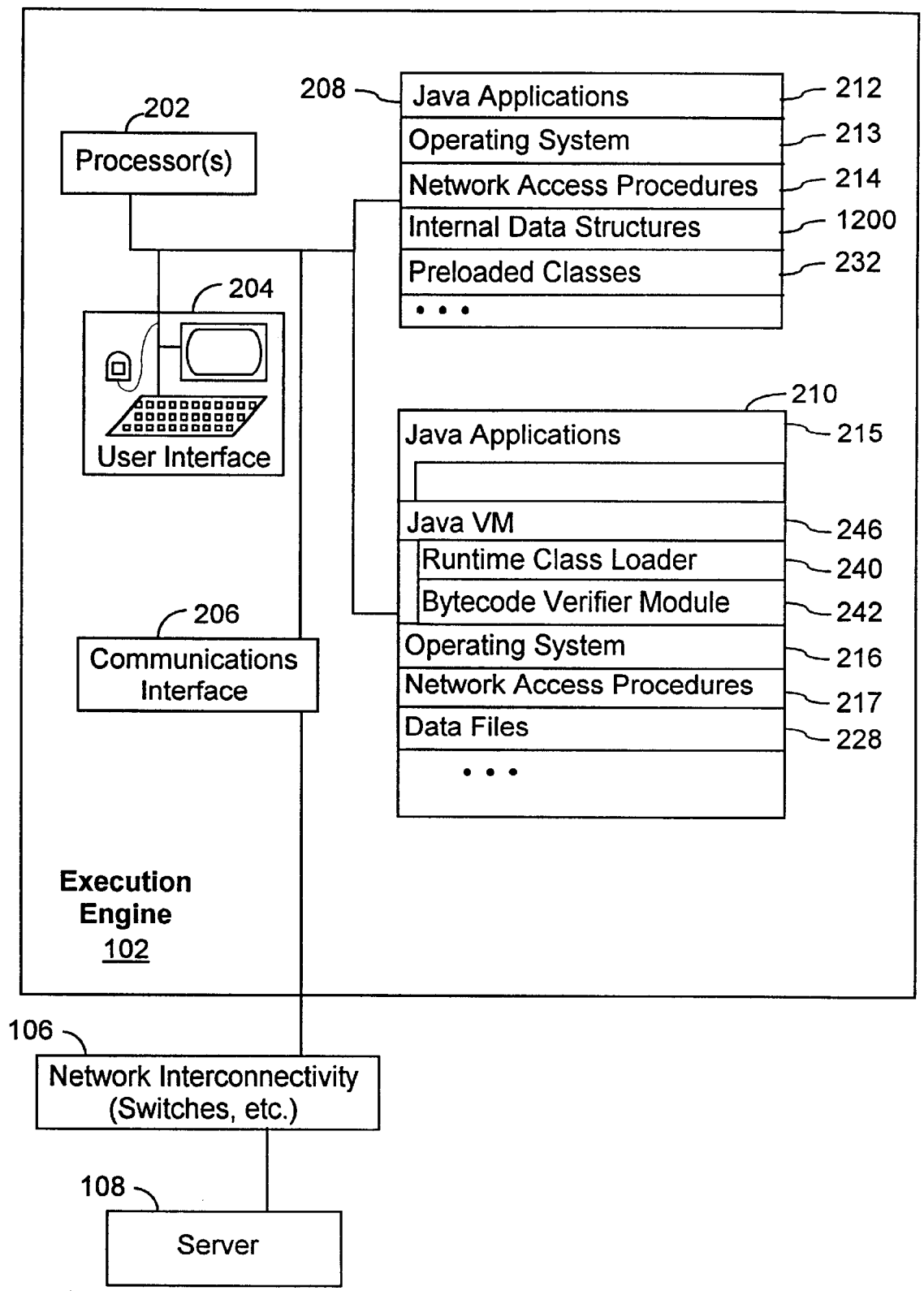
FIG. 4 is a block diagram of a execution engine in the distributed computer system of FIG. 1 in which the preloaded classes generated by the class preloader of FIG. 3 are loaded into ROM.

Referring to FIG. 4, an execution engine 102 can include one or more processors 202, a communications interface 206, a user interface 204, a read-only memory 208 and a random access memory 210. The read-only memory 208 stores program methods that have no unresolved references and program data that remains constant during program operation. In the preferred embodiment, methods and data stored in the ROM 208 include portions of Java applications 212 and the execution engine's support procedures. These support procedures include an operating system 213, network access procedures 214, preloaded classes 232 and internal data structures 1200 (FIG. 2) used by the preloaded classes 232.

The random access memory 210 stores:

a second portion of the Java applications 215 and support procedures 216, 217 that contain methods having unresolved references and data that is altered during the application's execution; and one or more data files 228 that the execution engine may utilize during its processing.

Figure 5:
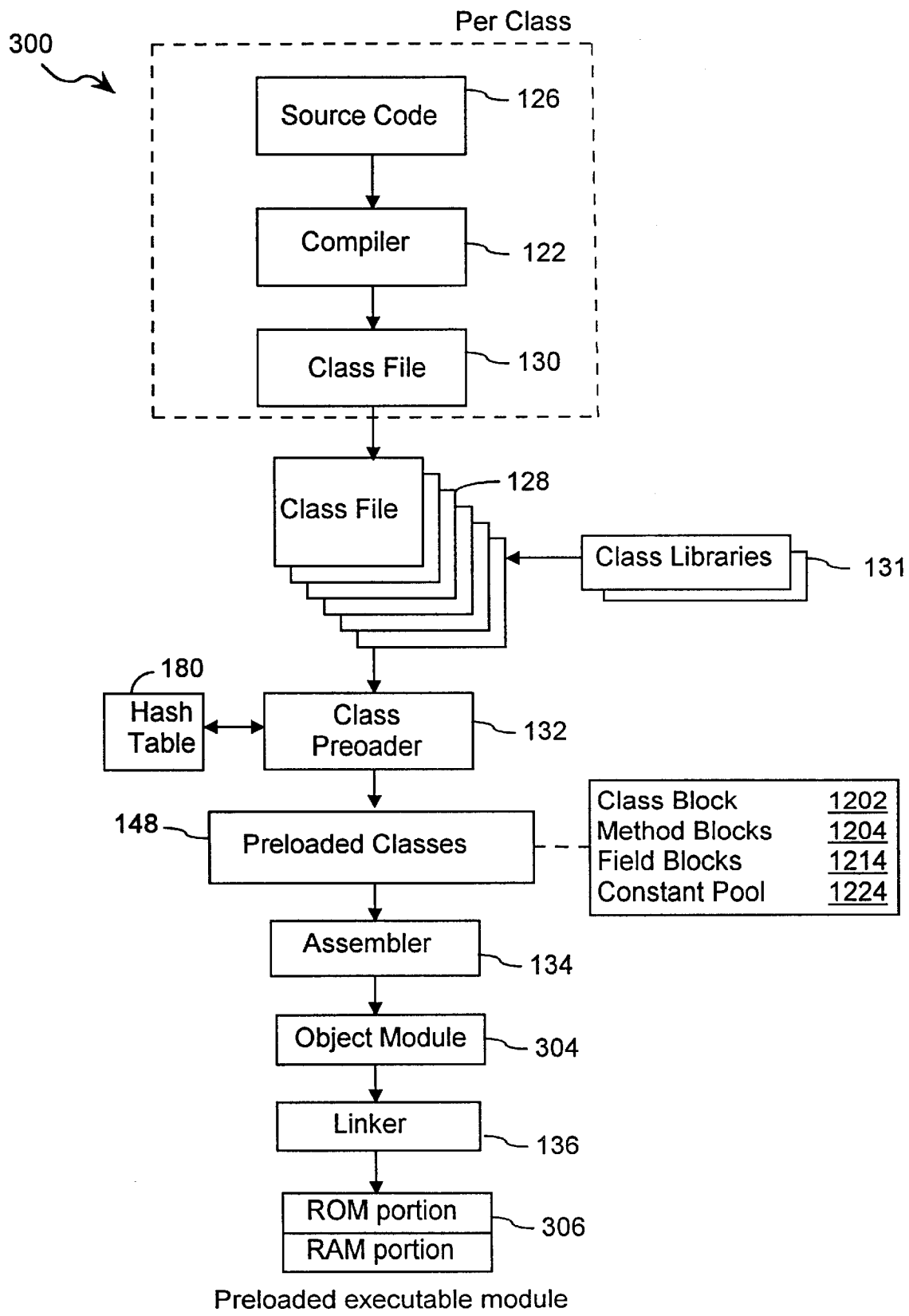
FIG. 5 is a flow diagram illustrating the processing components used to produce the preloaded executable module.

Referring to FIG. 5, there is shown a flow chart illustrating the sequence of steps used to produce a preloaded executable module. It should be noted that the method and system described herein pertains to preloading a Java application and other support procedures. Any Java application, or any other set of methods that are normally linked at run time could be preloaded using the method and system described herein.

Figure 1:
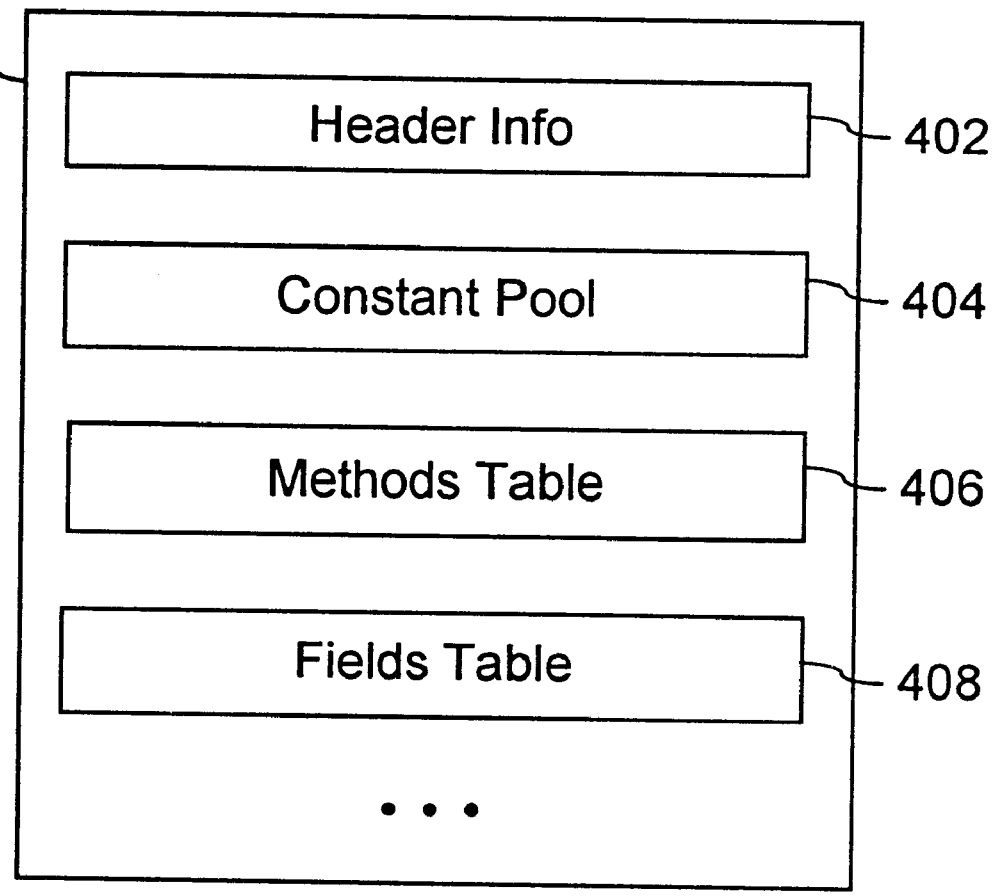
FIG. 1 illustrates the class file format common to the prior art and the present invention.

The source code 126 for each class that comprises the Java application is compiled by the compiler 122 into a class file 130, which is a platform-independent representation of the class. As described in reference to FIG. 1, the class file contains field and method tables, each method's bytecodes, constant data and other information. Alternatively, the class files corresponding to the application can already reside in one or more class libraries 131. The entire set of class files 128 that constitute an application to be preloaded are transmitted to the class preloader 132.

The job of the class preloader is to generate the preloaded classes 148 for an execution engine 102 (FIG. 4). The preloaded classes 148 include the class block 1202, method blocks 1204, field blocks 1214 and constant pool 1224 described in reference to FIG. 2. Among other things, the class preloader 132 determines which methods and fields associated with each class 130 can be stored in a read-only memory 208 and which must be stored in a random access memory device 210. For example, methods that invoke Java interfaces or utilize non-static instance variables need to reside in random access memory. This is because the byte-codes that implement interfaces are determined at runtime and non-static instance variables are altered for each instantiation of the associated class.

The class preloader 132 also performs a number of optimizations in order to produce a more compact internal representation of the executable code when that code is loaded into the execution engine ROM 208. For example, the class preloader 132 combines the constant pools associated with each class to eliminate redundancy in the internal representation of the class constant pool 310. In accordance with the present invention, the class preloader 132 also modifies the internal data structures 1200 (FIG. 2A) to take up less space in the ROM of the execution engine 102. It is an advantage of the present invention that this data structure optimization largely frees the internal representation from inefficient standard data structure formats 1200 used in the prior art.

The preloaded classes 148 are transmitted to an assembler or compiler 134 that produces an object module 304 having the required format for the linker 136 to map the data into the appropriate address spaces. Preferably, there will be two address spaces, one for a random access memory device and a second for read-only memory device. The object module 304 is then transmitted to the linker 136 which generates a memory layout for the classes in the application. Once the memory layout is determined, the linker 136 resolves all symbolic references and replaces them with direct addresses. The memory layout is partitioned into the two address spaces. The methods and fields that were flagged for read-only memory are included in the first address space and the methods and data that were flagged as requiring storage in a random access memory are included in a second address space. The output from the linker 136 is a preloaded executable module 306 containing the methods and data for these two address spaces. The processing flow of the present invention is now described with reference to FIG. 6.

Figure 6:
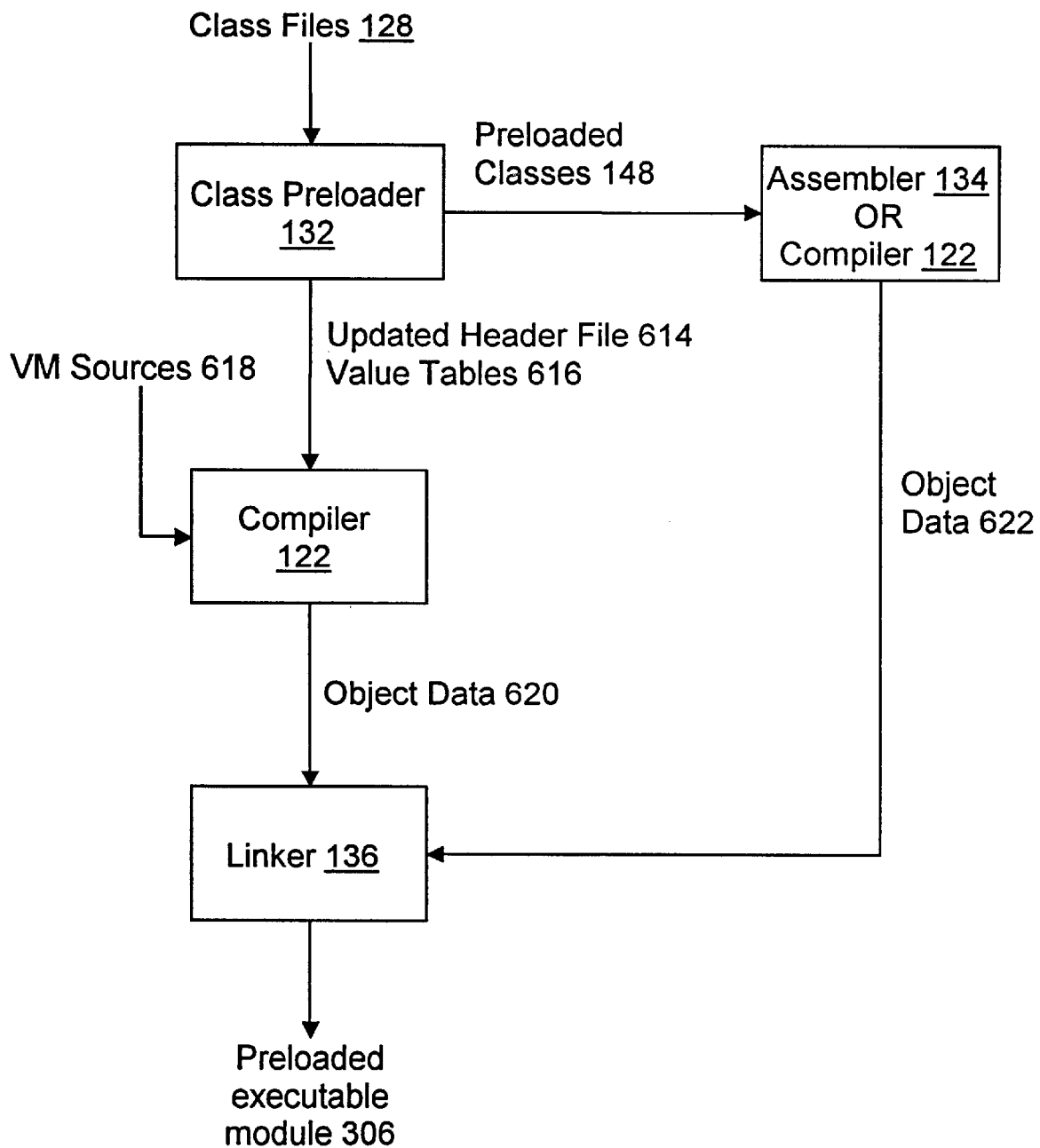
FIG. 6 is a flow diagram illustrating the processing components used to reduce the memory footprint of the preloaded executable module.

Referring to FIG. 6, there is shown a data flow diagram of the process employed by the present invention to reduce the memory footprint of internal data structures used by the VM. As already described in reference to FIG. 3, the class preloader 132 generates a set of platform-specific preloaded classes 148 from the class files 128. The preloaded classes 148 are data structure declarations that can be declared in assembler source or by a high level language. An assembler 134 or compiler 122 then converts these data declarations to object data 622. The class preloader 132 also determines the most efficient representation of the internal data structures 1200 composing the preloaded classes 232.

In the preferred embodiment a member of the internal data structures can be represented in one of two ways:

1) as a generic memory word (e.g., of 32 bits) that is the value of the member; or
2) as an index to a table of distinct values that can be taken by the member for each occurrence of the member.

The first representation is the only representation used in the data structures emitted by the prior art class preloader. This representation can be very inefficient when a particular member for which hundreds or thousands of occurrences exist only has a few distinct values. In such a situation, a full width memory word (e.g., 32 bits wide) is allocated for each of the occurrences, taking up as many as thousands of words of scarce storage in the ROM 208, even though only a few different values are stored. The second representation, which is employed by the present invention, solves this problem by generating a value table 616 to hold the definite values of such a member and generating for each occurrence of the member an index of only as many bits as is necessary to address all of the value table entries. The second representation is advantageous when the memory that would be allocated for the indices and value table for a particular member type is smaller than the allocated memory required for the generic representation. The method by which the present invention determines how to encode the member data structures is described below, in reference to FIG. 10.

Once the determination of how to represent the members is made, the class preloader 132 outputs for each member to be represented in the index+table format updated header information 614 (including modified member declarations and accessor functions enabling the VM 246 to access the modified member information) and a respective value table 616. The header information 614 and value tables 616, which are generated as source code, are compiled by the compiler 122 along with the virtual machine sources 618 that define the virtual machine to be executed in the execution engine 102. The linker 136 links the resulting object data 620 and the object data 622 to generate the preloaded executable module 306, which can be loaded into the execution engine 102. One by-proudet of the present invention is that, whenever new classes or members are to be incorporated in the preloaded classes 148, a new VM 246 must be generated. This is because the corresponding header information 614 and value tables 616 must be compiled with the VM sources 618. However, because the present invention automatically generates the header information 614 and member values 616 for any set of classes, generating the new VM requires no or minimal changes to the VM code. This is because the VM 246 always makes use of the accessor functions that are part of the header information 614. Thus, the present invention is able to generate an efficient representation of data structure members while facilitating generation of the VM.

The class preloader 132 is able to generate the efficient-index/table member representation because all possible values of the members are known. As a result, the number of bits needed for each index is also known. The number of occurrences of each members is also known. Moreover, the preferred embodiment presumes that the class files 128 represent the complete set of classes that are to be preloaded into the target execution engine 102. This presumption is especially applicable to execution engines 102 that are small handheld computers, which are unlikely to have the computing power and/or communications bandwidth to download classes on the fly in the conventional manner. Given that the number of indices and values are known and that there is no possibility of adding additional members or classes, it is possible for the class preloader 132 to arrange the indices to have an optimally compact or near-optimal arrangement when allocated by the execution engine 102. The class preloader 132 achieves this level of compaction by selecting the order of the indices in the updated header information 614. Referring to FIGS. 7A and 7B, there is illustrated the organization of the updated header information 614 and the value tables 616 along with specific examples of each data structure. These examples represent the outputs generated by the class preloader 132 corresponding to the data structure declaration 1230.N from FIG. 2B.

The updated header file 614 shown in FIG. 7A includes a set of data structure declarations 702, each of which can include, in any combination, updated member declarations 704 and un-updated member declarations 706. Each data structure declaration 702 corresponds to one of the data structures used by the VM 246. The updated member declarations 704 are for data structure members that have been modified by the class preloader 132 as index/table members and the un-updated members 706 are for data structure members that the class preloader 132 determined were best represented generically. Each data structure declaration 702 is associated with updated member table declarations 708, updated member accessor functions 710 and un-updated member accessor functions 712. Each updated member table declaration 708 is associated with a corresponding value table 616 and declares that table in the appropriate programming language. An updated member accessor function 710 defines the accessor function for updated (i.e., index/table) members using the table name defined in the respective updated member table declaration 708. The un-updated member accessor functions 712 are unchanged from those generated by the conventional class preloader 132.

For example, FIG. 7A shows the updated header file information 614 for the data structure 1230.N (Struct T) from FIG. 2B. This example assumes that the class preloader 132 determined that:

1) member1 has 400 values and is best represented as an index/table member, 2) member2 is best represented conventionally, 3) member3 has 200 values and is best represented as an index/table member, 4) member4 has 1500 values and is best represented as an index/table member, and 5) member5 is best represented conventionally.

Consequently, the class preloader 132 has generated a modified "struct T" declaration 704 wherein member1 is represented as a 9-bit integer index m1__idx (9-bits being enough to access 400 values), member3 is represented as an 8-bit integer index m3__idx (enough to access 200values) and member4 is represented as an 11-bit integer index m4__idx (enough-to access 1500 values). The other members, member2 and member5, are left unmodified as generic members of type mtype2 and mtype5, respectively.

The class preloader 132 has also generated an updated member table declaration 708 for member1 showing that the member1 values are stored in a value table (member1__value[ ]) of type member1. The member1__value table is declared as an external variable (extern), which tells the compiler 122 that the actual values of the table are defined in another file, in this case the value tables file 616. Similar updated member table declarations 708 are generated for member3 and member4.

The accessor function 710 for the updated member1 is correspondingly modified so that each time the corresponding accessor function, member1 of (T), is invoked the VM 246 that accesses the preloaded methods uses the member1 value (i.e., the 9-bit m1__idx) as an index into the member1__value table. The accessor functions 710 for the updated member3 and member 4 are modified in similar fashion.

Referring to FIG. 7B, there is shown a representation of the value tables 616, including a table 722.1 that defines the definite values that can be taken by the member1__value table declared in the header file 614. In this case, the member1__value table is defined as a constant array ("const mtype1 member1__value[ ]") consisting of 400 values, val 1, . . . val 400. Similar representations of the value tables for member3 and member4 are also provided (e.g., in the member 3 and 4 tables 722.3, 722.4).

Figure 8A:
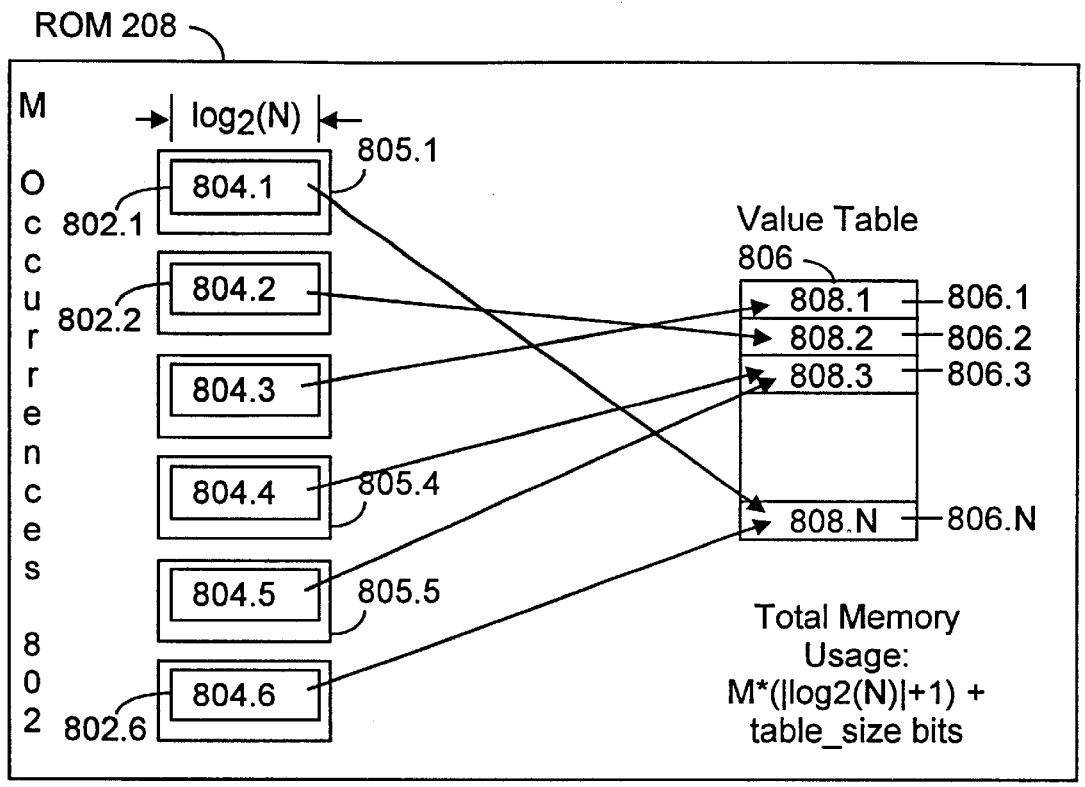
FIG. 8A illustrates the organization of same member occurrences and values after allocation in the execution engine ROM 208 in accordance with the present invention.

Referring to FIG. 8A, there is shown an illustration of the manner in which the internal data structures(specifically, the member occurrences 802 and value table 806 for a single member type) of the present invention are organized in the execution engine ROM 208. Each of the occurrences represents one occurrence in a preloaded class of the same member 802 and the data structure type 805 that encompasses it (the data structure type 805 is likely to include multiple members—e.g., see FIG. 2B ). Assuming that a particular member has N distinct values 808, which are stored in the value table 806, each of the M occurrences 802 of that member is allocated as an index 804 of width $(\lceil \log_2(N) \rceil +1)$ bits to the entry of the value table 806 that holds the member's value. For example, each of the occurrences 802.1 and 802.6 is an index to the table entry 806.N. This entry 806.N stores the definite value 808.N associated with those member occurrences. Thus, the total memory usage of this model is $M*(\lceil \log_2(N) \rceil +1)+\text{value\_table\_size}$ bits per member.

Figure 8B:
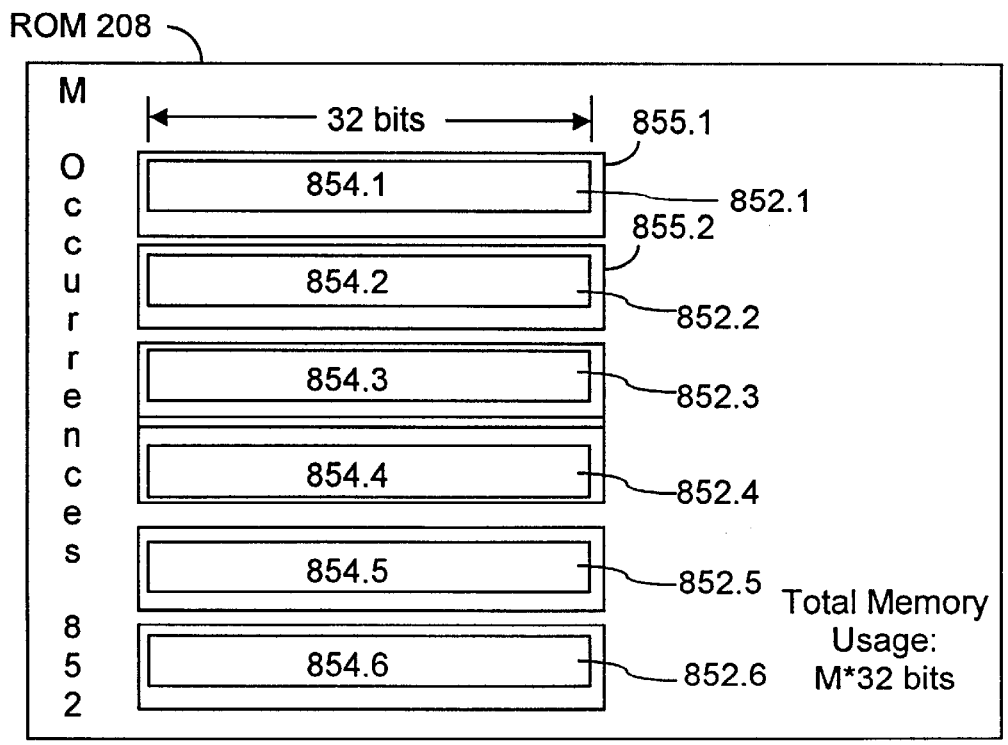
FIG. 8B illustrates the organization of same member occurrences after allocation in the execution engine ROM 208 in accordance with the prior art.

Referring to FIG. 8B, there is shown an illustration of the manner in which the prior art organizes occurrences 852 in the execution engine ROM 208 of a particular member. Each of the occurrences 852 represents one occurrence in a preloaded class of a particular member. Each of the M occurrences 852 of that member is allocated as a full-width memory word that stores the value 854 of the member for that occurrence, (i.e., each of these occurrences are represented in the first format referred to above.) Thus, the total memory usage of this model is M*32 bits (assuming 32-bit memory words). As a result, the present invention saves memory allocated for a particular member in the data structures when $M*(\lceil \log_2(N) \rceil +1)+\text{value\_table\_size}$ is less than $M*\text{memory\_word\_size}$ (e.g., M*32). As in the example of FIG. 8A, the fields 802 are likely to be just one element in a data structure declaration.

Figure 9A:
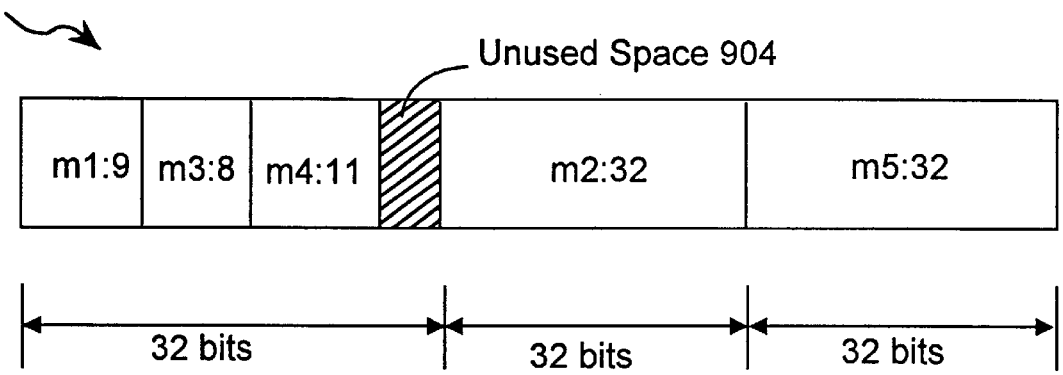
FIG. 9A illustrates the compact organization of a data structure instance with five members generated by the present invention.

Referring to FIG. 9A, there is shown an example of how the class preloader 132 of the present invention efficiently stores in the execution engine ROM 208 all of the members 802 of a particular data structure 902 (e.g., the members of the structure, Struct T 1230.N, FIG. 2B). Generally, the present invention packs the stored values (i.e., the indices 804) so that they occupy as much of a fixed length memory word as possible. In the illustrated situation, the memory words are 32 bits wide, but the present invention is applicable to memory words of any length. In the example shown in FIG. 9A, the 9-bit, 8-bit and 11-bit members m1, m3 and m4 from Struct T 902 are packed into a single 32-bit memory word. Values of the members m2, m5, which are represented conventionally (e.g., as 32-bit values), are stored in respective 32-bit general variables following the first word. In the preferred embodiment, these conventionally-represented members must be aligned on word boundaries (e.g., every 32 bits). There is no such requirement for the modified members. Therefore, for each data structure instance there are only 4-bits of unused space 904 between the fourth member m4 and the first general variable m2. The class preloader 132 aims to pack the members of an internal data structure into memory words as efficiently as possible given any combination of member representations and member sizes.

Figure 9B:
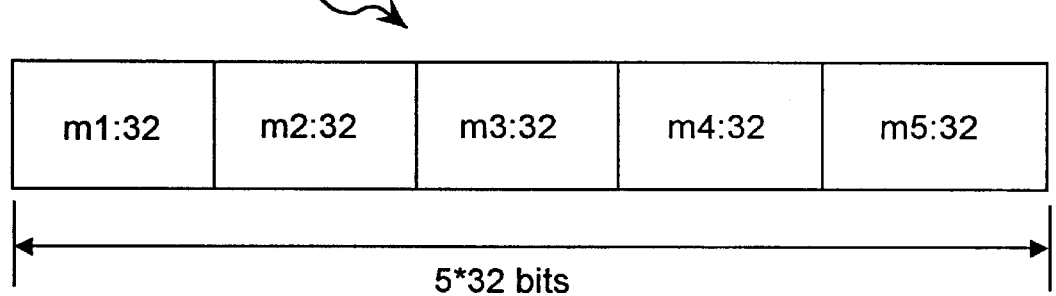
FIG. 9B illustrates the organization of the data structure instance from FIG. 9A generated by the prior art.

Referring to FIG. 9B, there is shown a diagram illustrating the format of the same data structure Struct T as stored by the prior art class preloader. Note that, in this system, the data structure requires 5 words to store the 5 members. Thus, the prior art is far less efficient then present invention (which only needs 3 words to store the same data structure information). The method of the present invention is now described in reference to FIG. 10.

This arrangement presents no problems to the preloaded classes' use of the accessor functions as the different memory locations of the indices 804 are resolved by the compiler 122 and the indices themselves store the index of their associated value 808.

Figure 10:
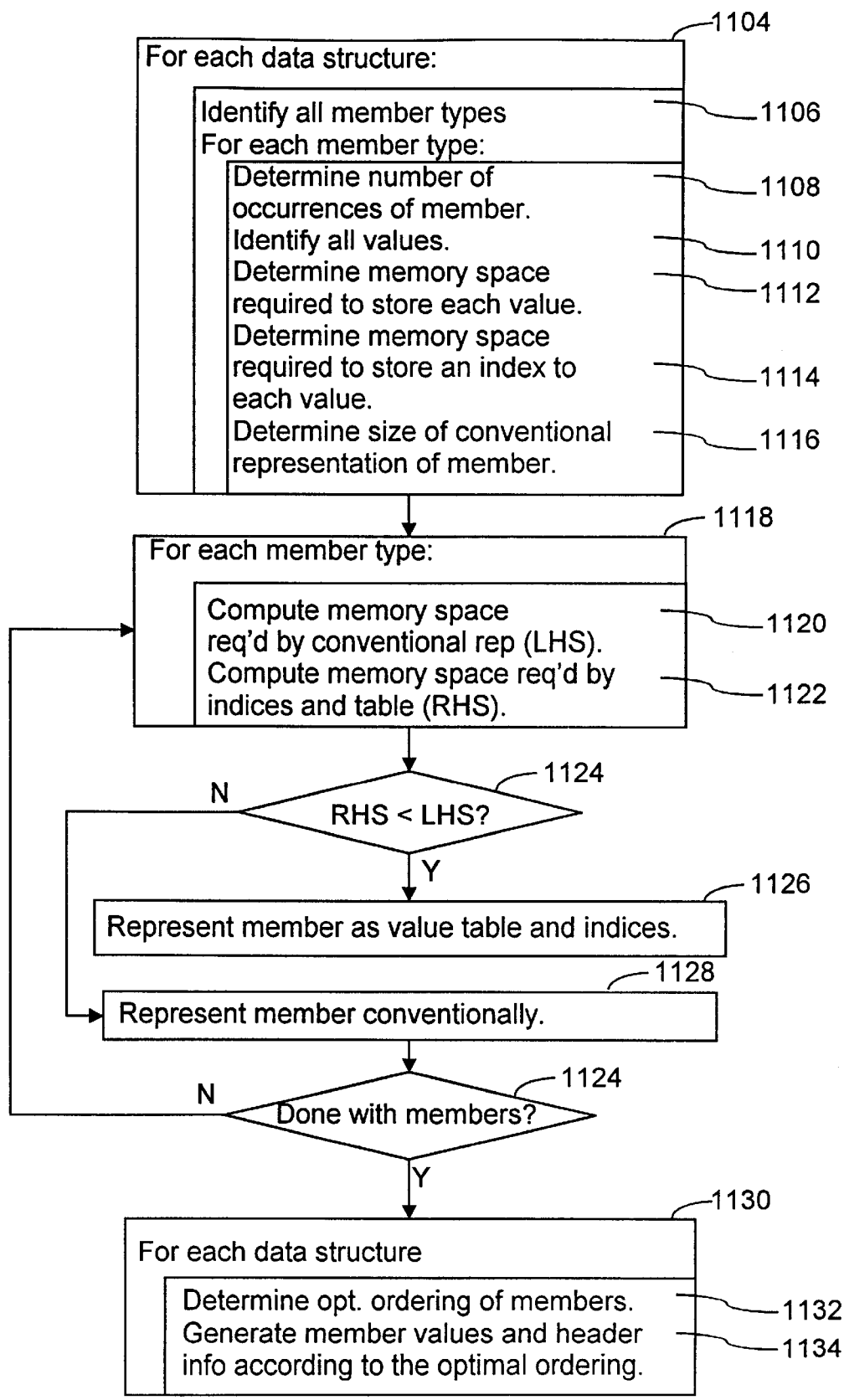
FIG. 10 is a flow chart of the method used by the class preloader to build the internal data structures used in the preloaded classes.

Referring to FIG. 10, there is shown a flow diagram of the method of the present invention implemented in the class preloader 132. The present method is implemented in two passes, which include an accounting pass (represented by the box labeled 1104) and a data structure declaration generation pass (represented by the rest of the steps). As the first accounting step (performed for all internal data structures), the preloader 132 identifies all member types of an internal data structure (1106). For example, referring to FIG. 2B, the five members of Struct T are that data structure's member types. For each member type, the class preloader 132 then performs the following processing:

Identify M occurrences of the member type (1108).

Identify N values of the M occurrences (1110).

Determine the memory space needed to store each value (1112).

Determine the memory space needed to store an index that can address the

N values (the index must be at least $|\log_2(N)|+1$ bits) (1114);

Determine the size of the conventional representation of the member occurrences (1116).

This processing is performed on all members of all internal data structures before proceeding with the steps starting with box 1118. This order of processing is preferable as the accounting statistics generated by the procedures in the box 1104 are used by the subsequent second pass steps. Typically, the accounting statistics are stored temporarily for use in the second pass.

Once all of the statistics have been generated, the class preloader 132 computes for each member type:

the memory space (LHS) required by the conventional representation of the member occurrences (1120); and the memory space (RHS) required by the novel representation of each member occurrence as an index to a value table (1122).

The class preloader 132 computes the LHS value in step 1120 as follows:

```
LHS  = (size of the conventional representation) × no. of occurrences
     = (size of the conventional representation) × M bits.
```

The class preloader 132 computes the RHS value in step 1122 as follows:

```
RHS  = (size of the member value) × no. of occurrences + size of the
       value table
     = (size of the member value) × M + M × (|log₂(N)| + 1) bits.
```

If the RHS is smaller than the LHS (1124-Y), the class preloader 132 represents that member type as a value table and indices (1126). If the RHS is not smaller than the LHS (1124-N), the class preloader will represent that member type conventionally (1128).

The class preloader 132 repeats the steps 1120, 1122, 1124, 1126, 1128 while other members remain to be processed (1124-N).

Once each member has been processed (1124-Y), the class preloader 132 performs a data structure declaration generation procedure 1130. In this procedure, for each data structure the class preloader 132 determines the optimal ordering of the data structure members (1732). The ordering process and its considerations have already been described in reference to FIG. 9A. The class preloader 132 then generates the member header information 614 and values table 616 in accordance with the optimal ordering (1134). The generation of the header information 614 and member values 616 has already been described in reference to FIGS. 7A and 7B.

Figure 11:
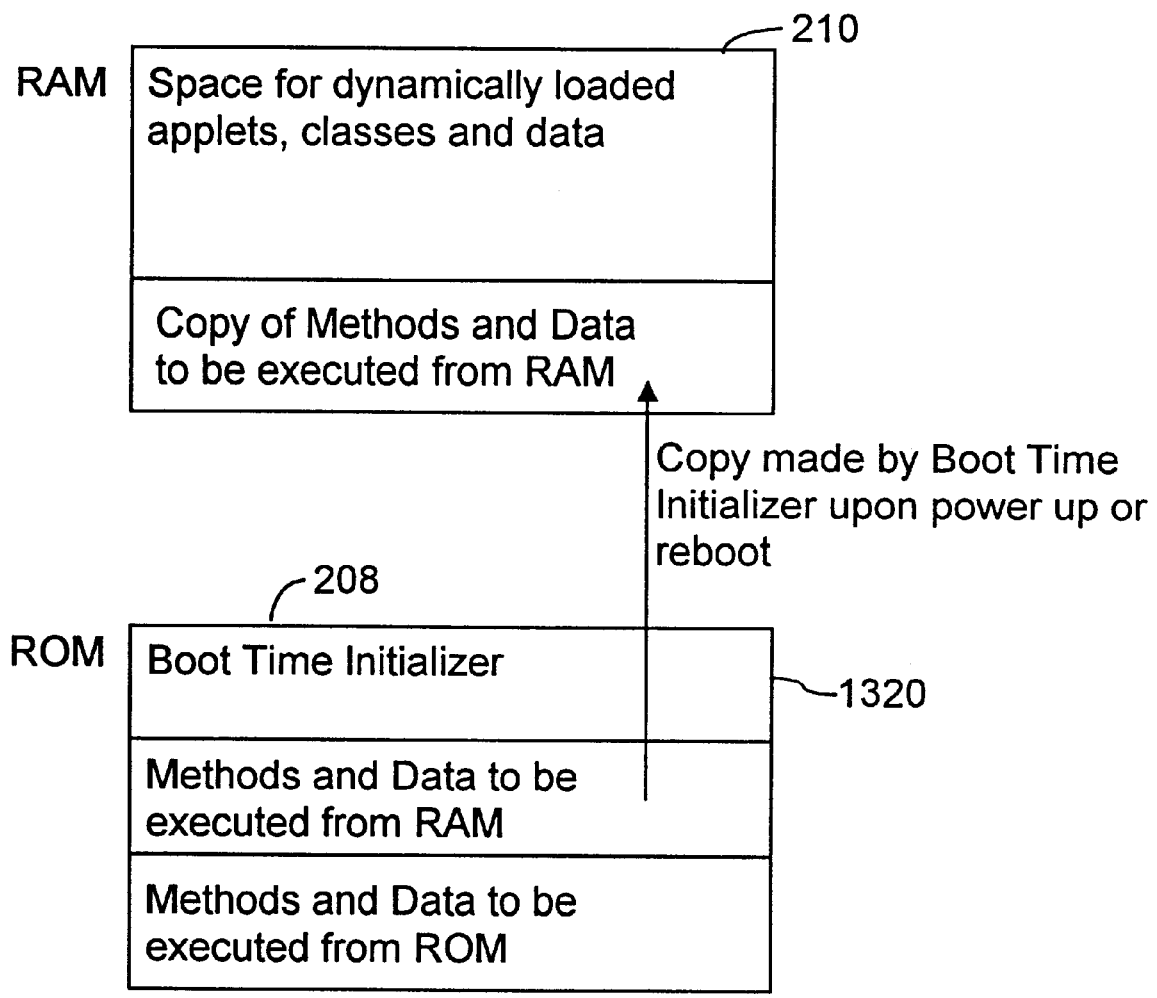
FIG. 11 is a block diagram showing the mapping of a preloaded application into read-only memory and random-access memory and indicating the loading of the portion of the methods and data mapped into random-access memory by a static class initializer.

Referring to FIG. 11, the preloaded executable module and boot time initiator 1320 are permanently stored in the read-only memory of an execution engine computer. Each time the execution engine computer is powered on or rebooted, the boot time initiator 1320 is automatically executed. Among other tasks, the boot time initiator copies all methods and data that must be resident in random access memory during execution to the random access memory locations assigned to them by the linker.

Although the method and system described herein have been described with reference to the Java programming language the present invention is applicable to computer systems using other object-oriented classes that utilize dynamic runtime loading of classes.

Further, the present invention is amenable for execution on various types of executable mediums other than a memory device such as a random access memory. Other types of executable mediums can be used, such as, but not limited to, a computer-readable storage medium, which can be any memory device, compact disc, or floppy disk.

The aforementioned system and method have been described with respect to executing a generic Java application and are applicable to any Java application. For example, the present invention could be employed to preload classes used by a personal information manager coded in Java intended to run on a handheld computer. Moreover, the Java application need not be run in a distributed environment, it can run in stand-alone mode executing in a execution engine or server computer without importing new classes from external systems.

While the present invention has been described with reference to a few specific embodiments, the description is illustrative of the invention and is not to be construed as limiting the invention. Various modifications may occur to these skilled in the art without departing from the true spirit and scope of the invention as defined by the appended claims in light of their full scope of equivalence.

What is claimed is:

1. A method for reducing memory footprint of preloaded classes to be incorporated into a runtime environment, comprising the steps of:

determining types of data structures represented in one or more class files used to define a plurality of preloaded classes, the plurality of preloaded classes having an associated total memory footprint, each of the data structure types including one or more members;

determining distinct values that can be taken by the members;

selecting values, from amongst a set of the distinct values, that are mathematically determined to satisfy a total memory footprint reduction requirement, wherein the total memory footprint reduction requirement is satisfied by a respective value only if a reduction in the total memory footprint would result by representing occurrences of the respective value as an index to a storage structure shared amongst the plurality of classes, and wherein satisfaction of the total memory footprint reduction requirement depends, at least in part, on a size of the shared storage structure;

storing each of the selected values in the shared storage structure;

generating a set of value indices for addressing stored values stored in the storing step; and generating accessor functions and member declarations that enable the runtime environment to use the selected members represented as the stored values and the set of value indices.

2. The method of claim 1, wherein the subset of the members selected to reduce the size of corresponding internal data structures are selected using the following steps:

for each of the members of a data structure:
counting occurrences of the member in the runtime environment;
determining a storage size needed to store the distinct values of the member;
determining an index size necessary to fully index the distinct values;
determining a conventional size needed for a conventional representation of the member; and
selecting the member as one of the subset when a second product equaling (the occurrences times the index size) plus the storage size is smaller than a first product equaling the occurrences times the conventional size.

3. The method of claim 2, wherein the step of generating the set of value indices comprises:

for each of the data structures, determining an optimal arrangement of the members that minimizes size of an occurrence of the data structure.

4. The method of claim 3, wherein the step of generating accessor functions and member declarations takes into account the optimal arrangement of the members, such that the runtime environment can access the value of a particular member occurrence via a respective accessor function even when the corresponding member has been repositioned in a respective data structure in accordance with the optimal arrangement.

5. The method of claim 1, further comprising the step of, when new classes are added to the runtime environment, repeating the steps of claim 1 to generate a new set of internal data structures that will require no modification of the runtime environment code that accesses the internal data structures.

6. The method of claim 1, wherein the preloaded classes represent the complete set of preloaded classes composing the runtime environment.

7. The method of claim 1, wherein the runtime environment is a Java virtual machine.

8. The method of claim , wherein the runtime environment is executed in a handheld device.

9. A system for reducing the memory footprint of preloaded classes to be incorporated into a runtime environment, the preloaded classes having an associated total memory footprint, the system comprising:

a set of class files; and
a class preloader configured to generate from the class files a set of preloaded classes and a plurality of internal data structure declarations configured to minimize the total memory footprint of the preloaded classes when allocated in memory;

the class preloader being configured to generate the internal data structure declarations so that each of a set of selected data structure members are represented as an index to a storage structure holding distinct values of the selected data structure member;

wherein the class preloader is configured to select data structure members that are mathematically determined to satisfy a total memory footprint reduction requirement, wherein the total memory footprint reduction requirement is satisfied by a respective data structure member only if a reduction in the total memory footprint would result by representing the respective data structure member as an index to the storage structure, and wherein satisfaction of the total memory footprint reduction requirement depends, at least in part, on a size of the storage structure.

10. The system of claim 9, wherein the class preloader is further configured to generate accessor functions and member declarations that enable the runtime environment to use the selected data structure members even though they are not represented conventionally.

11. The system of claim 9, wherein the class preloader is configured to assign membership in the selected data structure members to particular data structure members for which a conventional internal representation of the particular member's occurrences would occupy more space in the memory than a like number of indices to entries in a storage structure holding the distinct values of the particular member's occurrences.

12. The system of claim 11, wherein the class preloader is configured to determine an optimal arrangement of the members of a particular data structure that minimizes size of an occurrence of the particular data structure.

13. The system of claim 12, wherein the class preloader is configured to generate the accessor functions and member declarations in view of the optimal arrangement of the members, such that the runtime environment can access the value of a particular member occurrence via a respective accessor function even when the corresponding member has been repositioned in a respective data structure in accordance with the optimal arrangement.

14. The system of claim 9, wherein the class preloader is configured to choose the selected data structure members according to the following steps:

for each of the members of a data structure:
counting occurrences of the member in the runtime environment;
determining a storage size needed to store the distinct values of the member;
determining an index size necessary to fully index the distinct values;
determining a conventional size needed for a conventional representation of the member; and
selecting the member as one of the subset when a second product equaling (the occurrences times the index size) plus the storage size is smaller than a first product equaling the occurrences times the conventional size.

15. The system of claim 9, wherein, when new classes are added to the runtime environment, the class preloader is further configured to generate a new set of internal data structures in accordance with claim that will require no modification of runtime environment code that accesses the internal data structures.

16. The system of claim 9, wherein the preloaded classes represent the complete set of preloaded classes composing the runtime environment.

17. The system of claim 9, wherein the runtime environment is a Java virtual machine.

18. The system of claim 9, wherein the runtime environment is executed in a handheld device.

19. The system of claim 9, wherein the storage structure is a table.

20. A computer program product for use in a computer system for reducing the memory footprint of preloaded classes to be incorporated into a runtime environment executing on an execution engine, the preloaded classes having an associated total memory footprint, the computer program product including a computer readable storage medium and a computer program mechanism embedded therein, the computer program mechanism comprising:

a class preloader configured to generate from a set of class files the preloaded classes and a plurality of internal data structure declarations configured to minimize the total memory footprint of the preloaded classes when allocated in memory of the execution engine;

the class preloader being configured to generate the internal data structure declarations so that each of a set of selected data structure members are represented as an index to a storage structure holding distinct values of the selected data structure member;

wherein the class preloader is configured to select data structure members that are mathematically determined to satisfy a total memory footprint reduction requirement, wherein the total memory footprint reduction requirement is satisfied by a respective data structure member only if a reduction in the total memory footprint would result by representing the respective data structure member as an index to the storage structure, and wherein satisfaction of the total memory footprint reduction requirement depends, at least in part, on a size of the storage structure.

21. The system of claim 20, wherein the class preloader is further configured to generate accessor functions and member declarations that enable the runtime environment to use the selected data structure members even though they are not represented conventionally.

22. The computer program product of claim 20, wherein the class preloader is configured to assign membership in the selected data structure members to particular data structure members for which a conventional internal representation of the particular member's occurrences would occupy more space in the memory than a like number of indices to entries in a storage structure holding the distinct values of the particular member's occurrences.

23. The computer program product of claim 22, wherein the class preloader is configured to determine an optimal arrangement of the members of a particular data structure that minimizes size of an occurrence of the particular data structure.

24. The computer program product of claim 23, wherein the class preloader is configured to generate the accessor functions and member declarations in view of the optimal arrangement of the members, such that the runtime environment can access the value of a particular member occurrence via a respective accessor function even when the corresponding member has been repositioned in a respective data structure in accordance with the optimal arrangement.

25. The computer program product of claim 20, wherein the class preloader is configured to choose the selected data structure members according to the following steps:

for each of the members of a data structure:
counting occurrences of the member in the runtime environment;
determining a storage size needed to store the distinct values of the member;
determining an index size necessary to fully index the distinct values;
determining a conventional size needed for a conventional representation of the member; and
selecting the member as one of the subset when a second product equaling (the occurrences times the index size) plus the storage size is smaller than a first product equaling the occurrences times the conventional size.

26. The computer program product of claim 20, wherein the runtime environment is a Java virtual machine.

27. The system of claim 20, wherein the execution engine is a handheld device.

28. The computer program product of claim 20, wherein the storage structure is a table.

29. A runtime environment built from a collection of preloaded classes defined by one or more internal data structure types, each including one or more members, the preloaded classes having an associated total memory footprint, the runtime environment comprising:

a storage structure holding distinct values that can be taken by at least a subset of the members; and an index to a storage structure entry holding the distinct value of a respective member of the subset of the members serving as each occurrence of the respective member with the distinct value;

such that the runtime environment determines when necessary the distinct value of the respective member by retrieving contents of the storage structure at a location defined by the index;

wherein a plurality of the distinct values held in the storage structure have been mathematically determined to satisfy a total memory footprint reduction requirement, wherein the total memory footprint reduction requirement is satisfied by a respective value only if a reduction in the total memory footprint would result by representing occurrences of the respective value as an index to a storage structure shared, and wherein satisfaction of the total memory footprint reduction requirement depends, at least in part, on a size of the storage structure shared.

30. The runtime environment of claim 29, wherein all of the distinct values are known and the index to the storage structure entry is implemented using fewest bits able to index all of the distinct values associated with the respective member.

31. The runtime environment of claim 29, wherein occurrences of the members not included in the subset of the members are implemented as fixed-length values of the members.

32. The runtime environment of claim 31, wherein the runtime environment is a Java virtual machine (VM).

33. The runtime environment of claim 29, wherein the storage structure is a table.

34. A method for loading an execution engine with preloaded classes to be incorporated into a runtime environment to be executed on the execution engine, comprising:

downloading into the execution engine the preloaded classes, including a plurality of internal data structure declarations composing the preloaded classes configured so that each of a set of selected data structure members is represented as an index to a stored distinct value of the selected data structure member, the set being selected to minimize a total memory footprint associated with the preloaded classes when allocated in memory of the execution engine; wherein each member of the set has been mathematically determined to satisfy a total memory footprint reduction requirement, wherein the total memory footprint reduction requirement is satisfied by a respective member only if a reduction in the total memory footprint would result by representing occurrences of the respective member as an index to the stored distinct value of the respective member, and wherein satisfaction of the total memory footprint reduction requirement depends, at least in part, on a size of a storage structure configured to store the distinct value of the respective member.

35. The method of claim 34, wherein the preloaded classes are downloaded over the Internet.

36. The method of claim 34, further comprising: allocating the preloaded classes in the memory of the execution engine.

37. The method of claim 34, wherein the runtime environment is a Java virtual machine (VM).

38. The method of claim 34, wherein the execution engine is a handheld device.

39. A method for generating and loading into a client preloaded classes to be incorporated into a runtime environment to be executed on the client, comprising:

generating in a server the preloaded classes, including a plurality of internal data structure declarations composing the preloaded classes configured so that each of a set of selected data structure members is represented as an index to a storage structure holding distinct values of the selected data structure member, the set being selected to minimize a total memory footprint associated with the preloaded classes when allocated in memory of the client; and downloading into the client the preloaded classes;

wherein each member of the set has been mathematically determined to satisfy a total memory footprint reduction requirement, wherein the total memory footprint reduction requirement is satisfied by a respective member only if a reduction in the total memory footprint would result by representing occurrences of the respective member as an index to the storage structure, and wherein satisfaction of the total memory footprint reduction requirement depends, at least in part, on a size of the storage structure.

40. The method of claim 39, wherein the preloaded classes are downloaded over the Internet.

41. The method of claim 39, further comprising: allocating the preloaded classes in the memory of the client.

42. The method of claim 39, wherein the runtime environment is a Java virtual machine (VM).

43. The method of claim 42, wherein the client is a handheld device.

44. A method for reducing the total memory footprint of preloaded classes to be incorporated into a runtime environment, comprising the steps of:

determining distinct values that can be taken by members of internal data structures composing the preloaded classes;

selecting values, from amongst a set of the distinct values, that are mathematically determined to satisfy a total memory footprint reduction requirement, wherein the total memory footprint reduction requirement is satisfied by a respective value only if a reduction in the total memory footprint of the preloaded classes would result by representing occurrences of the respective value as an index to a storage structure shared amongst the plurality of classes, and wherein satisfaction of the total memory footprint reduction requirement depends, at least in part, on a size of the shared storage structure;

storing each of the selected values in the shared storage structure; and replacing each occurrence of a subset member with an index to the value of that occurrence, enabling the value of that occurrence to be retrieved via the index.

* * * * *